Patented Nov. 29, 1927.

1,650,984

UNITED STATES PATENT OFFICE.

EGON ELÖD, OF KARLSRUHE, GERMANY, ASSIGNOR TO THE FIRM RUDOLPH KOEPP & CO., OF OESTRICH-ON-THE-RHINE, GERMANY.

MAKING SODIUM FORMATE FORMIC ACID COMPOUNDS.

No Drawing. Application filed September 24, 1923, Serial No. 664,573, and in Austria September 5, 1922.

According to the present invention the production of a sodium formate-formic-acid compound of different percentages of acid is obtained in a surprisingly simple manner by the treatment of sodium formate with aqueous formic acid.

The process of the invention may be carried out by adding commercial sodium formate to aqueous formic acid of which the acid content exceeds 20%, the treatment being at elevated temperatures.

On cooling the mixture to normal temperatures, a sodium formate-formic acid compound separates in the form of well defined crystals which may be separated from the mother liquor by submitting the mixture to centrifugal force.

If an aqueous formic acid having an acid content of less than 50% is employed, a compound of three molecules of sodium formate with one of formic acid is obtained, that is, HCOOH.3HCOONa; while if the acid content exceeds 50%, either sodium biformate or a mixture of the two sodium-formate-formic acid compounds is obtained. The compound of three molecules of sodium formate with one of formic acid may be converted into sodium biformate in the simplest manner, for instance, by simply agitating it with an aqueous formic acid of suitable concentration, for instance, 60%.

The trisodiumhydroformate (HCOOH.3HCOONa)

is always formed on the addition of sodium formate to aqueous formic acid of 20 to 50% acid content. In the use of formic acid of more than 50% there is produced, according to the working conditions, either biformate or a mixture of biformate and triformate, or only triformate, according to the mass relations in which the acid and formate are used. If a definite amount of formic acid of more than 50% is added to sodium formate, there separates out first biformate, with a binding of the formic acid, which has as a result a decrease of the acid content. If now sodium formate is further added until the acid content comes back to 50%, the formation of trisodiumhydroformate will begin at the cost of the biformate and there will be obtained a mixture of bi- and tri-formates, while the acid concentration remains constant at 50%. Upon still further addition of sodium formate the biformate finally vanishes entirely,

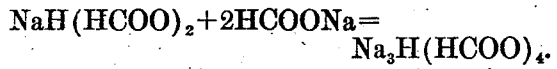

$$\text{Na}_3\text{H}(\text{HCOO})_4.$$

From then on only the trisodiumhydroformate is formed, while the acid concentration gradually comes back to 20%.

*Examples.*

(1) 100 kilograms of aqueous formic acid of 50% acid content is brought in contact with 100 kilograms of commercial sodium formate. After cooling the mixture resulting from the reaction to normal temperature, 160 kilograms of trisodiumhydroformate (HCOOH.3HCOONa) can be obtained from the mother liquor. The mother liquor, which is about 30% formic acid saturated with sodium formate, can be used subsequently for any desired purpose, for instance, after addition of a stronger acid, for the preparation of a new mixture.

(2) 110 kilograms of sodium formate are mixed with 100 kilograms of 80% formic acid. After the cooling of the mixture 114 kilograms of sodium biformate can be obtained at normal temperature upon precipitation. The mother liquor consists of about 60% formic acid saturated with sodium formate and it can be used for the direct production of trisodiumhydroformate (HCOOH.3HCOONa), or, after addition of a stronger formic acid, again for the production of sodium biformate.

(3) 125 kilograms of trisodiumhydroformate (HCOOH.3HCOONa) are mixed with 110 kilograms of formic acid of about 75%. 114 kilograms of sodium biformate can be obtained in a similar manner as above.

I claim:

1. A process for the production of sodium formate-formic acid compounds, consisting in adding sodium formate to aqueous formic acid, the percentage of acid of which is at least 20%.

2. A process for the production of sodium-formate-formic acid compounds, consisting in adding sodium formate to aqueous formic acid, the percentage of acid of which is at least 20%, and heating.

3. A process for the production of sodium formate-formic acid compounds, consisting in adding sodium formate to aqueous formic acid, the percentage of acid of which is at least 50%.

4. A process for the production of sodium formate-formic acid compounds, consisting in adding sodium formate to aqueous formic acid, the percentage of acid of which is at least 50%, and heating.

5. A process for the production of a sodium formate-formic acid compound, consisting in adding sodium formate to aqueous formic acid, the percentage of acid of which is 20 to 50%, and in converting the trisodiumhydroformate thus produced into biformate of sodium by treating it with aqueous formic acid of more than 50% acid content.

6. A process for the production of a sodium formate-formic acid compound, consisting in adding sodium formate to aqueous formic acid, the percentage of acid of which is more than 30%, continuing the addition until the concentration of the formic acid comes back to 50%, and in converting the trisodiumhydroformate thus produced into biformate of sodium by treating it with aqueous formic acid.

7. A process for the production of a sodium formate-formic acid compound, consisting in adding sodium formate to aqueous formic acid, the percentage of acid of which is more than 20%, in separating from the mother liquor the sodium formate-formic acid compound thus produced, and in adding to the mother liquor further quantities of sodium formate.

8. A process for the production of a sodium formate-formic acid compound, consisting in adding sodium formate to aqueous formic acid, the percentage of acid of which is more than 20%, in separating from the mother liquor the sodium formate-formic acid compound thus produced, in concentrating the mother liquor to at least 20% formic acid by addition of stronger formic acid, and in adding further quantities of sodium formate.

In testimony whereof I affix my signature.

EGON ELÖD.